June 22, 1948.　　　　L. R. GRUSS　　　　2,443,615
SHOCK ABSORBER
Filed Sept. 22, 1943　　　　　　　　　　2 Sheets-Sheet 1
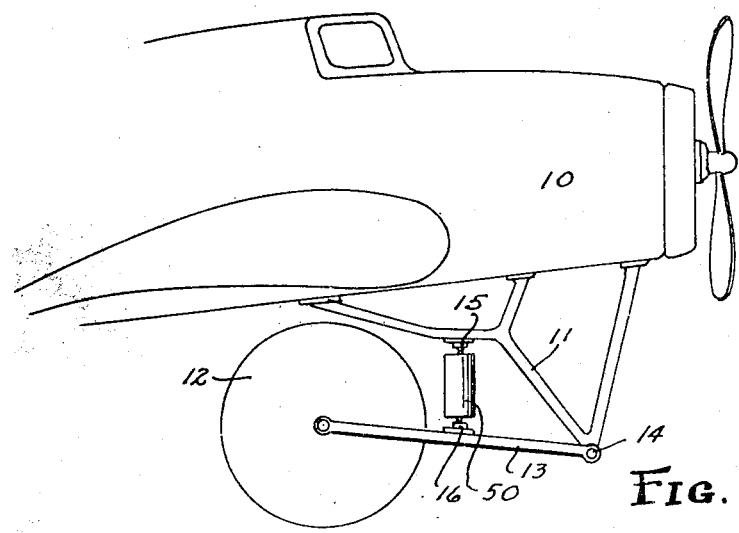
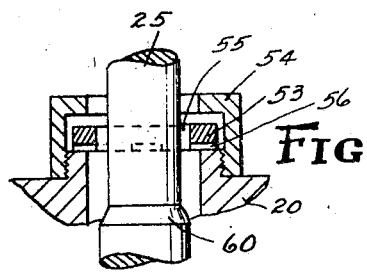
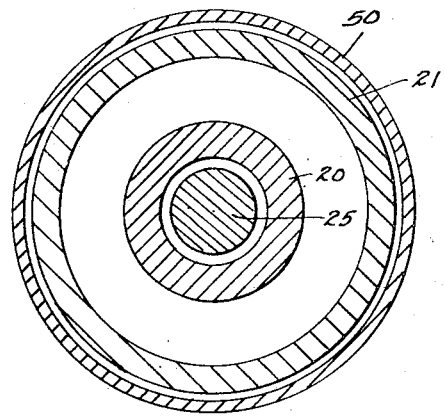
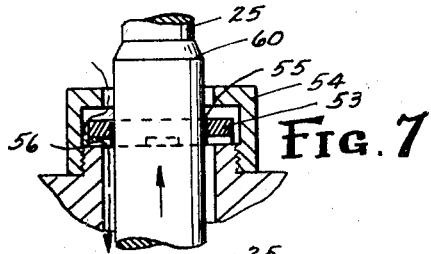
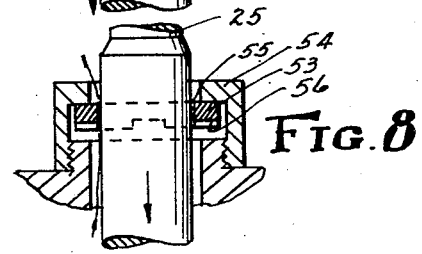
INVENTOR.
LUCIEN R. GRUSS
BY Bates, Teare & McBean
ATTORNEYS June 22, 1948.    L. R. GRUSS    2,443,615
SHOCK ABSORBER
Filed Sept. 22, 1943    2 Sheets-Sheet 2
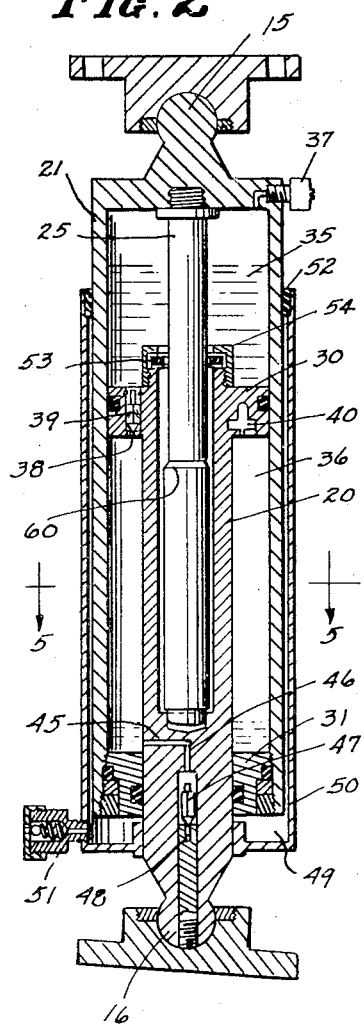
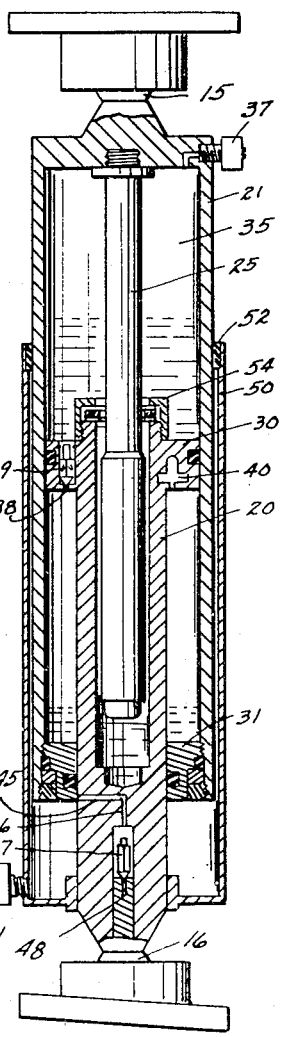
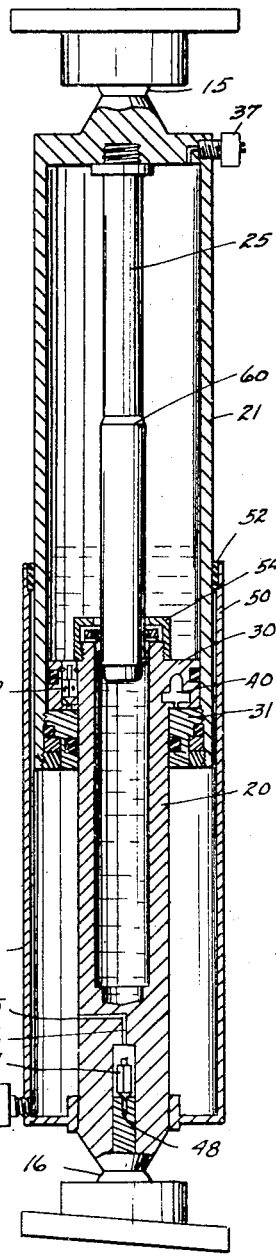
INVENTOR.
LUCIEN R. GRUSS
BY
*Bates, Teare, & McLean*
ATTORNEYS Patented June 22, 1948

2,443,615

UNITED STATES PATENT OFFICE 2,443,615

SHOCK ABSORBER

Lucien R. Gruss, Middletown, Ohio

Application September 22, 1943, Serial No. 503,324

8 Claims. (Cl. 267—64)

1

This invention relates to shock absorbers for use between two relatively movable members and is illustrated in connection with aircraft landing gear. The invention, however, is not limited in its scope to aircraft use, but is well adapted for utility on any vehicle or device having one part movable with relation to another.

Landing gear heretofore utilized particularly in aircraft work usually embodied a telescopically tubular construction, but the arrangement has been such that the tubes tended to bind against each other, thereby resulting in a bad landing. A further disadvantage of structures heretofore utilized has been the fact that the fuselage had to be disposed at an objectionable distance above the ground in order to obtain the desired degree of movement between the wheels and fuselage.

A further difficulty with previous devices has been the fact that liquid under pressure has been used as a shock absorbing medium and that the pressure could only be maintained at locations where special pumping equipment was accessible.

An object of the present invention is to make a shock absorber which obviates the possibility of sticking between the telescopically movable members, and which effects a material reduction in the height at which the fuselage must be disposed above the ground. Another object is to effect a structure wherein the pressure of the shock absorbing liquid may be maintained at any desired amount without the necessity for special pumping equipment.

In the drawings, Fig. 1 illustrates my invention as applied to an airplane; Fig. 2 is a vertical section through the shock absorber, showing the position of the parts when the airplane is on the ground; Fig. 3 is a section similar to Fig. 2, but showing the position of the parts as the airplane is leaving the ground; Fig. 4 is a section similar to Fig. 2, but showing the position of the parts when the wheels have moved an extreme distance away from the fuselage, as would be the case after the airplane has taken off; Fig. 5 is a section taken on the plane indicated by the line 5—5 in Fig. 2, and Figs. 6, 7, and 8 are enlarged sectional views illustrating the valve device that is utilized for controlling the flow of liquid past the ram during the operation thereof.

Although my invention is adapted for use between any two relatively movable members, nevertheless, in the present application, it is illustrated only in connection with an airplane having a fuselage 10, a strut 11, rigidly attached thereto, a landing wheel 12, and a wheel carrying arm 13 that is pivoted at 14 to the strut. My shock absorber is disposed between the strut and the wheel carrying arm and embodies a plurality of telescopic members, one of which is swivelly mounted at 15 to the strut 11, and the other of which is pivotally mounted at 16 to the wheel carrying arm.

The shock absorber device may best be understood by reference to Figs. 2, 3, and 4, as embodying an inner hollow member 20 which has a swivel connection 16 to the wheel carrying arm 13 through the ball and socket construction illustrated at the lower end of Fig. 2, while the outer hollow member 21 has a swivel connection 15 with the strut 11 through a similar ball and socket connection illustrated at the upper end of Fig. 2. A ram 25 rigidly mounted on the outer hollow member is adapted to project into the inner hollow member and to extend for substantially the full length thereof as is shown in Fig. 2. The inner portion of the member 20 is in communication with the upper end of the outer hollow member so as to permit the flow of liquid therebetween, but preferably such flow is controlled by a valve device mounted with an enclosure 54, the details of which will hereinafter be more fully set forth.

A sealing device extends across the space between the inner and outer hollow members. One sealing device is preferably in the form of an enlargement 30 on the upper end of the inner member, which acts as a piston within the outer member, and the other sealing device is shown as a cylinder head 31 which is carried by the lower end of the outer hollow member and has a sealing engagement with the outer wall of the inner member 20.

The piston 30 operates to divide the outer hollow member into a liquid storage reservoir 35 and into a charging chamber 36, the operation of which will be hereinafter more fully set forth. Normally, the chamber 35 has more than a sufficient quantity of liquid therein to fill the inner hollow member when the ram is drawn to the extreme end of its outward movement, as shown in Fig. 4, and such liquid may be placed under initial pressure by means of any source of air under pressure through a valve 37.

Fluid may also be forced into the reservoir chamber through the passageway 38 in the piston 30, which is normally closed by the pressure in the chamber against a valve 39. This situation occurs whenever the piston 30 approaches the cylinder head 31 and when the pressure within the space 36 consequent upon such movement exceeds the pressure in the chamber 35. Close contact between the members 30 and 31 is permitted by virtue of a cavity 40 which is formed in the underside of the piston 30 and which allows a small amount of air to be compressed thereinto. A further function of said cavity is to permit withdrawal of the piston from the cylinder head without creating an undue degree of vacuum therein.

Provision is made for venting the charging chamber 36 to the atmosphere whenever the piston 30 reaches the limit of its upward stroke, or as expressed in another way, whenever the cylinder head 31 reaches the limit of its downward stroke, and such result is obtained by providing a passageway 45 in the lower end of the member 20 which is in communication with the chamber 36 when the parts are in the position as shown in Fig. 2. The passageway 45 is shown as extending laterally of the member 20 and as communicating at its inner end with the passageway 46 in which a check valve 47 is disposed, and the passageway 46 at its lower end is in communication with a laterally extending passageway 48 which in turn opens into a chamber 49 that is formed by a casing 50. The casing 50 is primarily a dust-proofing casing and is telescopically positioned on the member 21 and has a check valve 51 leading to the atmosphere at the lower end thereof. The upper end of the casing is shown as having a layer of packing material 52 which functions to prevent the entry of dust and other foreign matter into the space 49.

To cause a quick or rapid movement of the wheel 12 away from the fuselage 10 upon the take-off of the airplane, and to cause a slower movement with relation thereto upon landing, I may utilize a valve device that is movable under the influence of the fluid pressure differential on opposite sides thereof, to present different sized openings for the passage of liquid into and out of the inner hollow member 20. Thus, by reference to Figs. 6, 7, and 8, the valve may take the form of a washer or annular plate 53 which floats within a housing 54 that is carried by the upper end of the member 20. The plate has an aperture 55 which clears the ram by a sufficient amount only to permit the liquid to flow therebetween at a designated rate. The plate also has undercut passageways 56 which have a larger cross sectional area than the space between the plate and ram, and thereby permit a greater rate of flow of the liquid whenever the plate is in such position that the undercut passageways are available for use.

The valve member 53 is self-centering within the housing 54, and seeks its own level in accordance with any pressure differential between the inner member 20 and the reservoir 35. Thus, in Fig. 6, where the ram and coacting parts are shown in the same position as in Fig. 2, the washer 53 rests upon the bottom wall of the housing 54 so that liquid may flow readily from the reservoir into the member 20 through the undercut passageways 56. This same condition would prevail when the ram is moving out of the member 20 as shown for example, in Fig. 7. In Fig. 8, however, where the ram is shown as moving in the opposite direction, the pressure exerted on the liquid within the member 20 exceeds that in the reservoir 35, whereupon the washer 53 is forced upwardly against the top wall of the housing 54 and inasmuch as those coacting surfaces have a ground fit, the liquid can leave the hollow member 20 only through the passageway 55. The aperture 55 is relatively enlarged, however, when the ram reaches a predetermined point in its downward travel by virtue of the fact that the upper end of the ram has a reduced diameter. In practice, the position of the reduced diameter is defined by the location of the shoulder 60 and is determined in accordance with the rapidity of movement desired by the ram.

In practice, where a source of air under pressure is available, the chamber 35 may be brought to the desired pressure by connecting the valve 37 to a source of air under pressure, but where such facilities are not available, then the desired pressure may be obtained by jacking up the airplane and successively raising and lowering the wheel 12 thereby exerting a pumping action between the members 20 and 21 until the pressure for which the unit is designed is obtained in the chamber 35. The presence of the cavity 40 in the piston 30 limits the extent to which the pressure in the chamber 35 can be raised by this method, but the size of the chamber is predetermined to permit the attainment of the maximum desired pressure in the chamber 35.

A shock absorber made in accordance with the present invention is advantageous in that the distance of the fuselage above the ground may be materially diminished over present types of landing gear, while a saving of about 75 to 80% of the amount of oil required in the former landing gears has been effected. Additionally, the construction has avoided the possibility of telescopic tubes to stick to each other, because there is no side thrust placed upon the shock absorber elements. Moreover, the present invention considerably reduces the weight over that type of mechanism heretofore utilized, and the invention has materially reduced the number of parts required in the construction of an efficient, practical shock absorber.

I claim:

1. A shock absorbing device for use between two relatively movable members, comprising two telescopically mounted hollow members, each mounted on one of the relatively movable members, the hollow members having the walls thereof spaced from each other and having means at each end thereof for dividing the space within the outer hollow member into a liquid storage chamber and a pressure charging chamber respectively, a check valve between the charging and storage chambers operable only to admit fluid from the charging to the storage chamber, the inner hollow member having one end thereof open into the storage chamber and the outer hollow member having a ram rigidly mounted thereon and adapted to extend into the inner hollow member, a valve device for controlling the flow of liquid between the inner member and storage chamber, and means carried by the inner hollow member for opening the charging chamber to the atmosphere only at a predetermined portion of the stroke of the inner member with respect to the outer member.

2. A shock-absorbing device for use between two relatively movable members including two telescopically mounted hollow members each positioned on a different one of said relatively movable members, a ram carried by one of the hollow members and movable into the other hollow member, each hollow member having sealing means adjacent one end thereof bearing against the other hollow member, one of said sealing means providing one wall of a reservoir in the first hollow member, the second hollow member being in communication with said reservoir, one of said sealing means having a cavity therein open to the space within the first hollow member on the side opposite the reservoir, and said second hollow member having a valve controlled passageway extending between said space and said reservoir.

3. A cushioning device for use between two relatively movable members, including an upper cylinder mounted on one of the members and a lower cylinder mounted on the other member, a ram carried by the upper cylinder and telescopically movable with respect to the lower cylinder, said ram being of two diameters with the greater diameter extending through the greater part of the ram's telescopic length, there being sufficient space between the walls of the cylinder and ram to permit the flow of fluid from the end of the ram through such space to the telescoping end of the cylinder, the lower cylinder having a piston at one end thereof which functions to provide a liquid reservoir on one side thereof, and said reservoir being in communication with the inner cylinder, whereby liquid may flow into and out of the reservoir consequent upon movement of the ram with respect to the lower cylinder, the stepped ram providing a greatly increased flow at the end of its telescoping action.

4. A shock absorber for use between two relatively movable members, embodying inner and outer hollow members carried by the respective relatively movable members, one of the hollow members having a ram rigidly mounted thereon and adapted to project into the other hollow member from one end thereof to force fluid out of said member as the two hollow members are moved toward each other, sealing means for effecting a seal between the inner and the outer hollow members so as to provide space for a liquid reservoir, one of the hollow members having one end open to said reservoir, movable valve means carried by the last-mentioned hollow member to regulate the flow of fluid from such member to the reservoir, and a valve independent of the sealing means and operating to permit fluid to pass only from one side of the sealing means into the reservoir.

5. A shock absorbing device for use between two relatively movable members, comprising two hollow members mounted on the respective relatively movable axially spaced members and telescopically movable with respect to each other, one of the hollow members having one end thereof open into the other, a ram carried by the other hollow member and extending into the open end of the first-mentioned hollow member, valve controlled means carried by one of the hollow members adapted to cause the space between said hollow members to be open to the atmospheric pressure during a portion only of the relative movement between said hollow members, means to cause the compression of air in said space during another portion of the relative movement of said cylinders, means at one end of one of the hollow members to provide a reservoir for holding liquid under pressure, valve means to admit compressed air from the space between said cylinder to pass into said reservoir when the pressure in the reservoir drops below that of the pressure in the space between said cylinders, the other hollow member being in communication with the liquid under pressure in said reservoir, and a member carried by the last-named hollow member for effecting a differential rate of flow of liquid into and out of the hollow member consequent upon movement of the ram into and out of said chamber.

6. A shock absorber for use between two relatively movable members, comprising an inner and an outer hollow member, the inner member having one end thereof opening into the other member, the outer member having a ram rigidly mounted thereon and projecting into the inner member, said ram having a diameter less than the internal diameter of the inner member and adapted to displace fluid therein to force fluid out of the inner member and into the outer member as the members approach each other, and a valve device disposed adjacent the open end of the inner hollow member for controlling the flow of fluid along the ram into and out of the inner hollow member consequent upon movement of the ram axially thereof, said valve device including a housing carried by the inner hollow member and having an aperture therein through which the ram extends and a floating plate embracing the ram and disposed within the housing, there being a restricted passageway between the plate and ram, and means operating upon movement of the plate thereof with respect to the housing to permit fluid to flow around the plate from the inner hollow member as the members move away from each other and consequent upon movement of the ram axially thereof in one direction and prevent such flow when the ram moves in the other direction consequent upon the movement of the members toward each other.

7. A cushioning device for use between two relatively movable members, including an outer cylinder and an inner cylinder mounted for telescopic movement with respect to each other on the respective members, a ram carried by the outer cylinder and extending into the other cylinder and to have a clearance with respect thereto for the entire length thereof, the inner cylinder providing a container for liquid which opens at the top thereof into the outer cylinder, the ram being adapted to displace liquid in the inner cylinder and to force it into the outer cylinder, the space within the outer cylinder above the inner cylinder comprising a liquid-and-air chamber, the inner hollow member being adapted to be moved into the outer hollow member to compress the air in said chamber, means for effecting a liquid seal between the cylinders at the bottom of the chamber, and means for automatically pumping back into the chamber any liquid that may seep past said sealing means, means operable during the telescopic movement of the cylinders with respect to each other to maintain automatically a predetermined minimum air pressure within said chamber, and a movable valve member carried by the inner cylinder and cooperating with said ram to control the flow of fluid from the inner cylinder to the outer cylinder, said cylinders, ram and means cooperating to utilize the resistance of liquid passing from the inner cylinder into said chamber to absorb the energy produced by an initial loading of the device, and to utilize the resistance of compressed air within said chamber to absorb the energy produced by subsequent loading of the device.

8. A cushioning device for use between two members that are movable with relation to each other, embodying a cylinder and ram mounted for telescopic movement between the respective members, said ram being out of contact with the cylinder wall at the free end of the ram and from thence to the end of the cylinder where the ram enters to provide a free passageway for fluid from beyond the ram to the other end of the cylinder, and a movable valve member disposed at the telescoping end of the cylinder and arranged to permit the flow of liquid from said space into and out of the cylinder consequent upon movement of the ram with respect to the cylinder so as to allow liquid to enter the cylinder at a different rate from that leaving the cylinder.

LUCIEN R. GRUSS.

REFERENCES CITED

The following references are of record in the file of this patent:

UNITED STATES PATENTS

| Number | Name | Date |
|---|---|---|
| 1,104,945 | Westinghouse | July 28, 1914 |
| 1,146,335 | Liebau | July 13, 1915 |
| 1,234,311 | Duncan | July 24, 1917 |
| 1,289,082 | Bangs | Dec. 31, 1918 |
| 1,378,281 | Ross | May 17, 1921 |
| 1,655,786 | Guerritore | Jan. 10, 1928 |
| 2,008,094 | Chester | July 16, 1935 |
| 2,039,135 | Waugh et al. | Apr. 28, 1936 |
| 2,130,885 | Johnson | Sept. 20, 1938 |
| 2,146,089 | Onions | Feb. 7, 1939 |
| 2,333,096 | Dowty | Nov. 2, 1943 |

FOREIGN PATENTS

| Number | Country | Date |
|---|---|---|
| 127,904 | Great Britain | June 19, 1919 |
| 572,175 | Germany | Mar. 11, 1933 |
| 782,123 | France | Mar. 11, 1935 |